(12) United States Patent  (10) Patent No.: US 8,454,168 B2
Cheng et al.  (45) Date of Patent: Jun. 4, 2013

(54) STEREO DISPLAY APPARATUS

(75) Inventors: Ming-Hui Cheng, Hsin-Chu (TW);
Kun-Rong Chang, Hsin-Chu (TW);
Fang-Hsuan Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 336 days.

(21) Appl. No.: 12/891,747

(22) Filed: Sep. 27, 2010

(65) Prior Publication Data

US 2011/0102745 A1 May 5, 2011

(30) Foreign Application Priority Data

Nov. 5, 2009 (CN) .......................... 2009 1 0211831

(51) Int. Cl.
*G03B 21/00* (2006.01)

(52) U.S. Cl.
USPC .......... 353/7; 353/8; 353/79; 353/94; 353/99; 353/119; 359/224.2; 349/5

(58) Field of Classification Search
USPC ............... 353/7, 8, 10, 94, 37, 38, 46, 79, 98, 353/99, 119, 122; 359/224.2, 236, 462, 850, 359/851, 443, 446, 454–459; 345/418–421, 345/424, 427; 349/5, 7, 8, 9; 348/739, 744
See application file for complete search history.

(56) References Cited

U.S. PATENT DOCUMENTS

| | | | |
|---|---|---|---|
| 5,612,709 A * | 3/1997 | Sudo et al. ........................ 345/8 |
| 6,064,423 A | 5/2000 | Geng | |
| 6,511,182 B1 * | 1/2003 | Agostinelli et al. ............... 353/7 |
| 6,554,430 B2 | 4/2003 | Dorval et al. | |
| 6,636,216 B1 * | 10/2003 | Silverbrook et al. ......... 345/427 |
| 6,765,566 B1 | 7/2004 | Tsao | |
| 6,779,892 B2 * | 8/2004 | Agostinelli et al. ............... 353/7 |
| 7,059,729 B2 | 6/2006 | Hoshino et al. | |
| 7,168,809 B2 | 1/2007 | Hoshino et al. | |
| 7,520,615 B2 | 4/2009 | Hoshino et al. | |
| 2001/0040671 A1 * | 11/2001 | Metcalf ........................... 353/94 |
| 2005/0035962 A1 * | 2/2005 | Ishibashi et al. ............... 345/419 |
| 2008/0055546 A1 * | 3/2008 | DeCusatis et al. ................. 353/7 |
| 2008/0136973 A1 * | 6/2008 | Park ............................... 348/744 |

FOREIGN PATENT DOCUMENTS

CN 1652614 8/2005

OTHER PUBLICATIONS

"First Office Action of China Counterpart Application", issued on Dec. 7, 2011, with English translation therof, p. 1-p. 12, in which the listed reference was cited.

* cited by examiner

*Primary Examiner* — Georgia Y Epps
*Assistant Examiner* — Sultan Chowdhury
(74) *Attorney, Agent, or Firm* — Jianq Chyun IP Office

(57) ABSTRACT

A stereo display apparatus includes a support member, at least one projector, a screen, first reflectors, and an actuator. The projector is connected to the support member, and includes a battery and an image memory module. The projector is capable of emitting an image beam. The screen is connected to the support member. The first reflectors surround the support member. The actuator is connected to the support member and is capable of driving the support member to rotate. The support member is capable of driving the projector and the screen to rotate. When the projector and the screen rotate, the image beam is projected onto the first reflectors in sequence, and the first reflectors reflect the image beam onto the screen in sequence.

18 Claims, 7 Drawing Sheets

STEREO DISPLAY APPARATUS

CROSS-REFERENCE TO RELATED APPLICATION

This application claims the priority benefit of China application serial no. 200910211831.2, filed on Nov. 5, 2009. The entirety of the above-mentioned patent application is hereby incorporated by reference herein and made a part of this specification.

BACKGROUND OF THE INVENTION

1. Field of the Invention

The invention relates to a display apparatus. More particularly, the invention relates to a stereo display apparatus.

2. Description of Related Art

Generally, most traditional display apparatuses display plane image and lack three-dimension effect. In addition, some stereo display apparatuses provide three-dimension effect by displaying different images for right eye and left eye respectively. However, stereo image provided by this kind of stereo display apparatus is limited at a specific observing angle. For example, when this kind of stereo display apparatus displays the front of an object, the user is unable to observe the back of the object.

A conventional stereo display apparatus divides image provided by a projector into 24 sub-images arranged as a circle, and the 24 sub-images are projected onto a top reflecting mirror. The top reflecting mirror reflects the 24 sub-images respectively onto 24 reflecting mirrors arranged as a circle, and the 24 reflecting minors reflect the 24 sub-images onto a rotating screen surrounded by the 24 reflecting mirrors.

The 24 sub-images represent appearance of an object at 24 different view angles. The screen is capable of rotating to project the 24 sub-images in 24 different directions, such that a user may observe appearances of an object at these view angles by turning 360 degrees relatively to the stereo display apparatus. Thus, for eyes of a user, an object is created in the space for providing a vivid stereo display effect.

However, the image projected by the projector is divided into 24 sub-images, and the region surrounded by the 24 sub-images is not used, such that the resolution of this kind of stereo display apparatus is very low. In addition, in this kind of stereo display apparatus, the screen is disposed between the projector and the top reflector. For rotating the screen, a motor is disposed over the projector. Thus, it is hard to firmly support the screen and the motor, such that the structure is not stable and the screen is likely to be swayed.

Further, the motor is disposed on a light path of an image beam projected by the projector, such that interference by stray light may be happened. In another aspect, a projector with larger size is required for this kind of stereo display apparatus, such that the size of the stereo display apparatus is larger.

In U.S. Pat. No. 6,765,566, a screen, a projecting device, and two reflecting mirrors are disclosed in FIG. 13, wherein the screen and the two reflecting mirrors are capable of rotating along an axis. Besides, a screen, a light valve, a projecting lens, a reflecting minor, and a light source are disclosed in FIG. 17 of this US patent, wherein the screen, the light valve, the projecting lens, and the reflecting mirror are capable of rotating along an axis.

In addition, U.S. Pat. No. 6,064,423, no. 6554430, no. 7059729, no. 7168809, and no. 7520615 also provide several stereo display apparatus systems.

SUMMARY OF THE INVENTION

The invention is to provide a stereo display apparatus.

One embodiment of the invention provides a stereo display apparatus including a support member, at least one projector, a screen, a plurality of first reflectors, and an actuator. The projector is connected to the support member, and includes a battery and an image memory module, wherein the projector is capable of emitting an image beam. The screen is connected to the support member. The first reflectors surround the support member. The actuator is connected to the support member and is capable of driving the support member to rotate. The support member is capable of driving the projector and the screen to rotate. The image beam is projected onto the first reflectors in sequence, and the first reflectors reflect the image beam onto the screen in sequence when the projector and the screen rotate.

One embodiment of the invention provides a stereo display apparatus including a support member, at least one projector, a screen, at least one first reflector, and an actuator. The projector is connected to the support member, and includes a battery and an image memory module, wherein the projector is capable of emitting an image beam. The screen is connected to the support member. The first reflector is connected to the support member. The actuator is connected to the support member and is capable of driving the support member to rotate. The support member is capable of driving the projector, the first reflector, and the screen to rotate. The image beam is projected onto the first reflector continuously, and the first reflector reflects the image beam onto the screen when the projector, the first reflector, and the screen rotate.

In summary, the embodiment or the embodiments of the invention may have at least one of the following advantages:

In the stereo display apparatus of the embodiments of the invention, the projector and the screen are capable of rotating together, such that the projector is capable of projecting correct image onto the screen rotating to different angles. Thus, the resolution of the stereo display apparatus of the embodiments of the invention is effectively increased.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
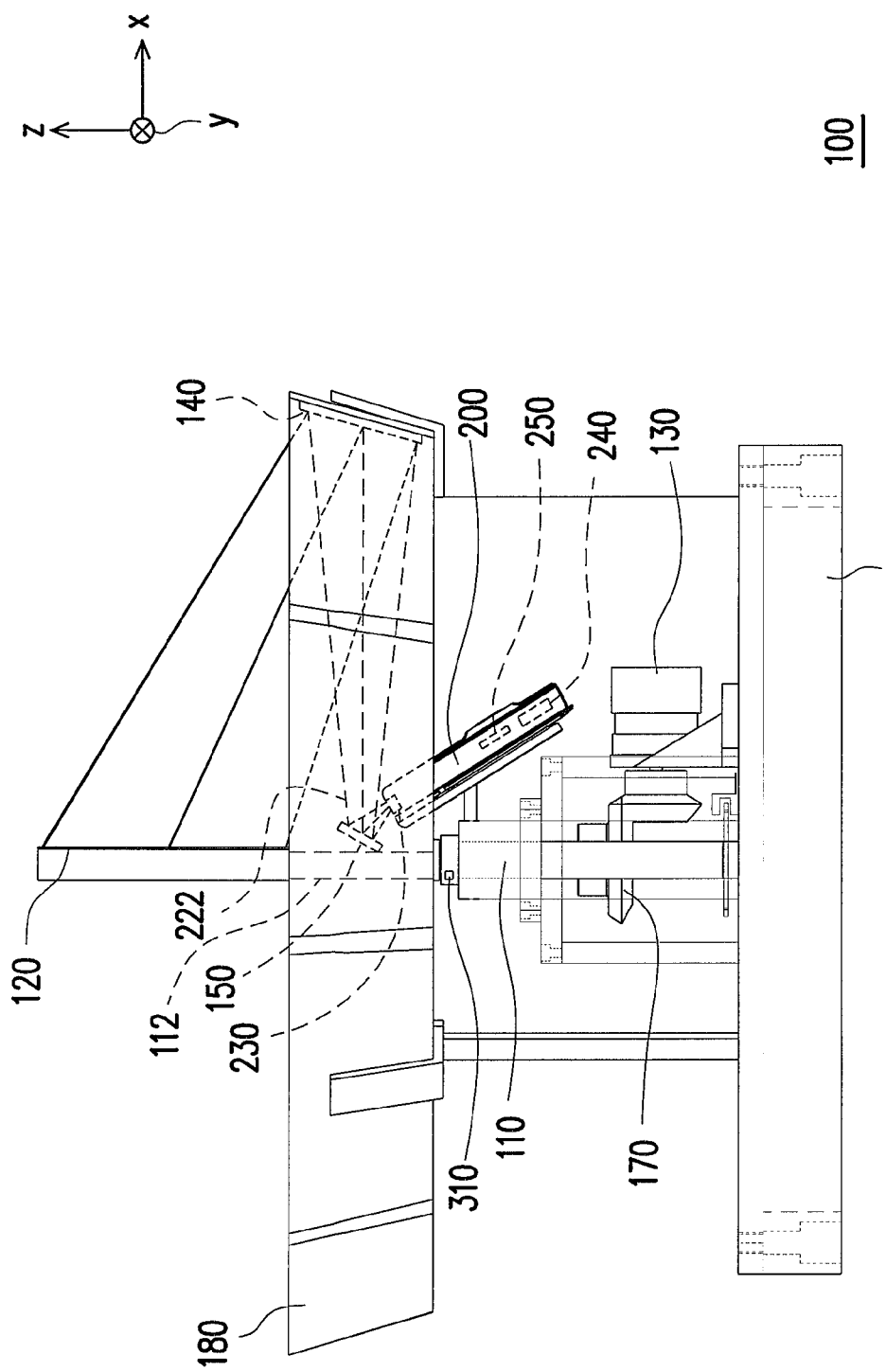
FIG. 1A is a side view showing a stereo display apparatus according to one embodiment of the invention.
Figure 1B:
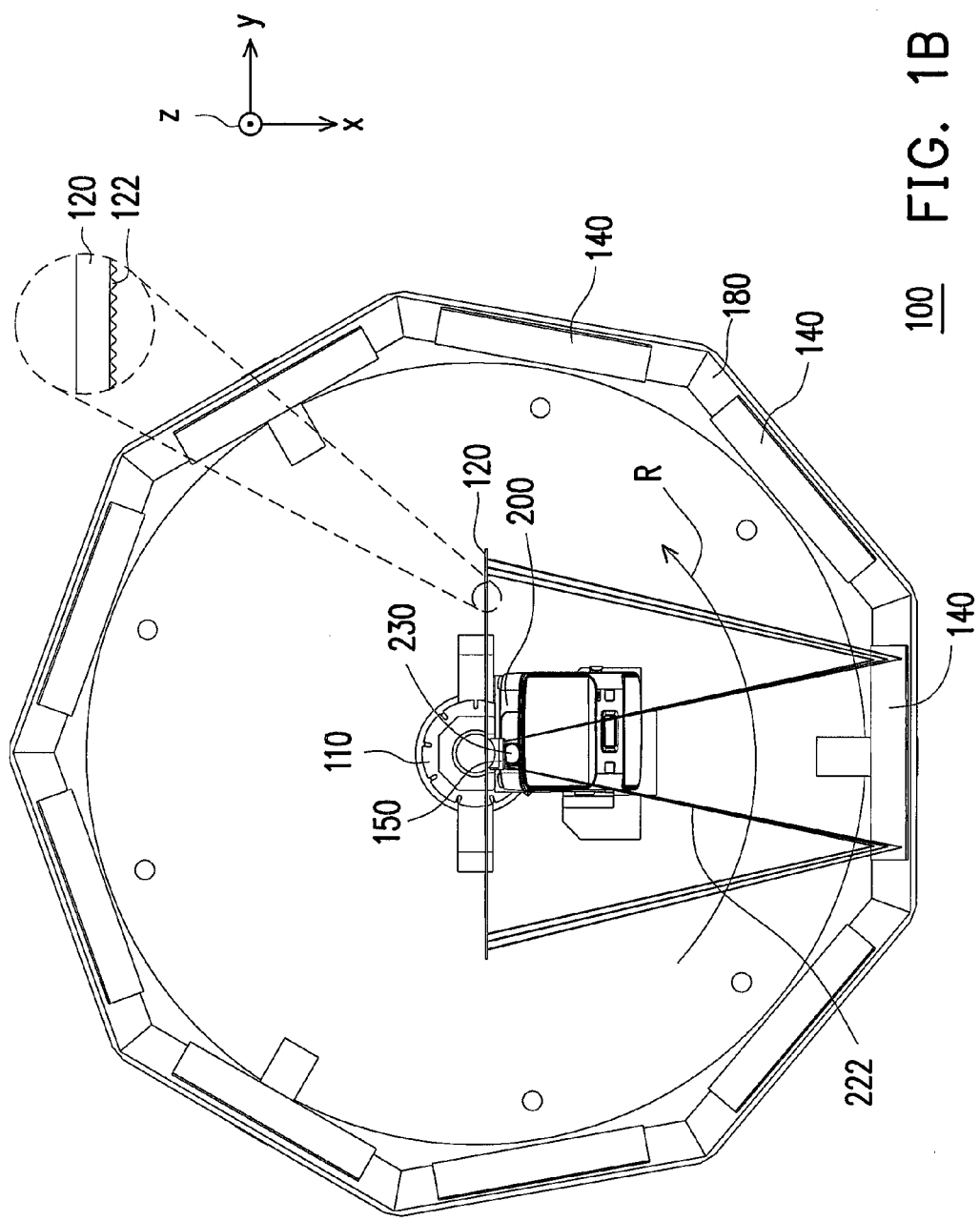
FIG. 1B is a top view showing the stereo display apparatus of FIG. 1A.
Figure 1C:
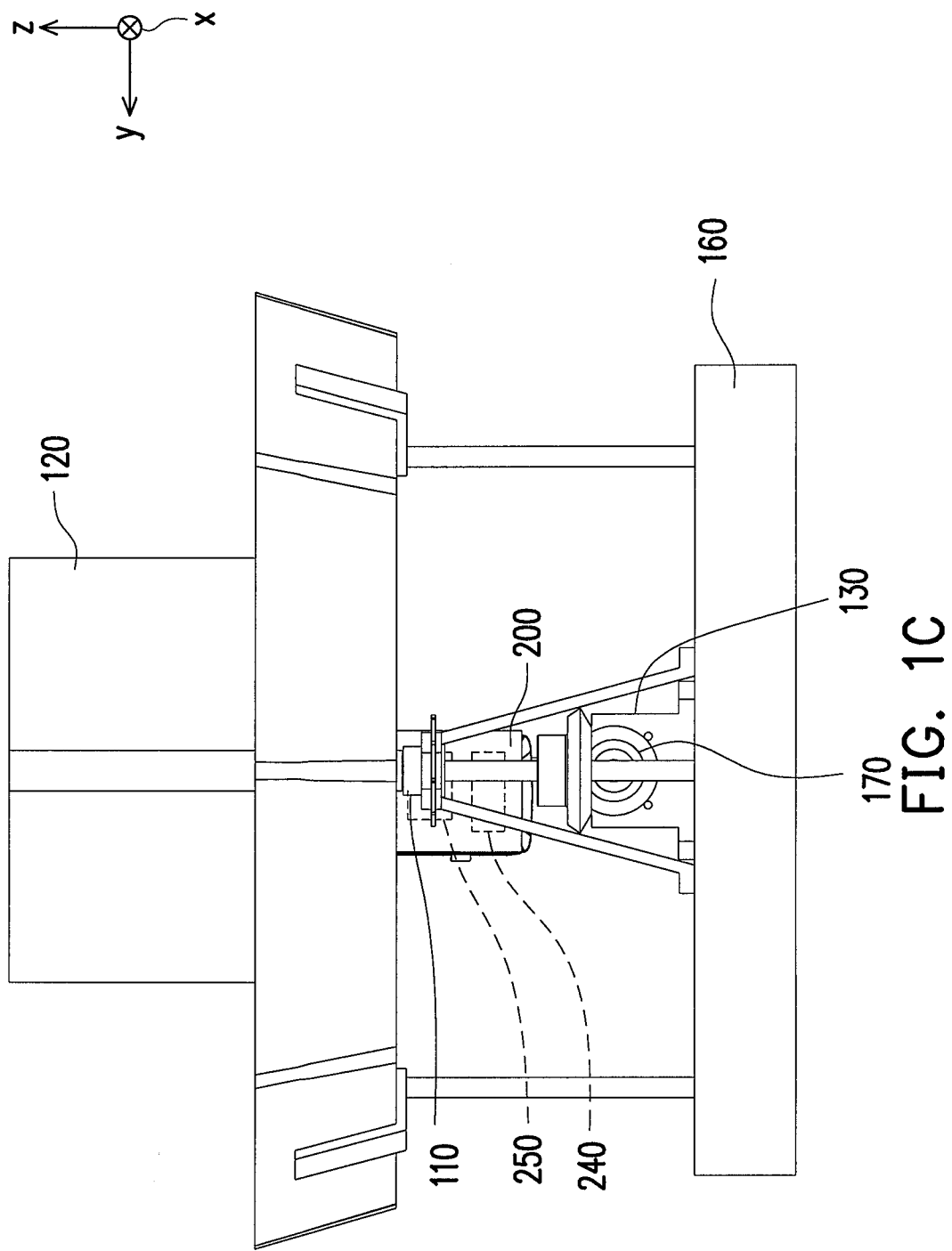
FIG. 1C is another side view showing the stereo display apparatus of FIG. 1A.

Referring to FIG. 1A, FIG. 1B, and FIG. 1C, the view directions of FIG. 1A, FIG. 1B, and FIG. 1C are directions defined by the x axis, the y axis, and the z axis perpendicular to each other. Referring to FIG. 1A, FIG. 1B, FIG. 1C, and FIG. 2, a stereo display apparatus 100 of the embodiment includes a support member 110, at least one projector 200 (showing one in FIG. 1A), a screen 120, a plurality of first reflectors 140 (showing nine in FIG. 1B), and a actuator 130. The projector 200 is connected to the support member 110 and includes a battery 240 and an image memory module 250, wherein the projector 200 is capable of emitting an image beam 222.

In the embodiment, the projector 200 further includes a lighting system 210, a light valve 220, a projecting lens 230, and a processing unit 260. The battery 240 is electrically connected to the light valve 220, the lighting system 210, the processing unit 260, and the image memory module 250. The lighting system 210 is capable of emitting a lighting beam 212 to the light valve 220. The light valve 220 is for example a LCOS (liquid-crystal-on-silicon) panel, a DMD (digital micro-mirror device) or a transmissible liquid crystal panel. The light valve 220 is capable of transferring the lighting beam 212 into the image beam 222, and the projecting lens 230 projects the image beam 222 to outer space. In the embodiment, the projector 200 is for example a pico-projector. However, in other embodiments, the projector 200 may also be other kinds of projecting devices. Further, the image memory module 250 is for example a memory card, such as a CF (Compact Flash) card, a SD (Secure Digital) card, a MS (Memory Stick) card, or a SM (Smart Media) card, and the image memory module 250 may also be a MD (MicroDrive) or other suitable memory module. In the embodiment, the processing unit 260 is disposed in the projector 200. However, in other embodiments, the processing unit 260 may be disposed out of the projector 200.

The screen 120 is connected to the support member 110, and the first reflectors 140 surround the support member 110. The actuator 130 is connected to the support member 110, wherein the actuator 130 is capable of driving the support member 110 to rotate, and the support member 110 is capable of driving the projector 200 and the screen 120 to rotate. When the projector 200 and the screen 120 rotate, the image beam 222 is projected onto the first reflectors 140 in sequence, and the first reflectors 140 reflect the image beam 222 onto the screen 120 in sequence.

In the embodiment, the stereo display apparatus 100 further includes a base 160, wherein the actuator 130 is fixed on the base 160, and the support member 110 is rotatably disposed on the base 160. In this embodiment, the actuator 130 is for example a motor. However, in other embodiments, the actuator 130 may be other elements capable of driving the support member 110 to rotate. In addition, in the embodiment, the support member 110 includes a rotating axle 112, and the projector 200 and the screen 120 are fixed on the rotating axle 112. The support member 110, the projector 200, and the screen 120 rotate along the rotating axle 112. Further, in the embodiment, the stereo display apparatus 100 further includes a transmission device 170 connected to the actuator 130 and the support member 110. The transmission device 170 is for example a gear set including at least one gear. Thus, the actuator 130 is capable of driving the support member 110 to rotate by the transmission device 170.

In this embodiment, the stereo display apparatus 100 further includes a support frame 180 connected to the first reflectors 140 and the base 160. Each of the first reflectors 140 is for example a reflecting mirror, and the support frame 180 is used to fix the first reflectors 140. In the embodiment, the stereo display apparatus 100 further includes at least one second reflector 150 (showing one in FIG. 1A) connected to the support member 110, wherein the support member 110 is capable of driving the second reflector 150 to rotate. The second reflector 150 is for example a reflecting mirror. When the projector 200, the second reflector 150, and the screen 120 rotate along the rotating direction R in FIG. 1B, the image beam 222 is projected onto the second reflector 150 continuously, and the second reflector 150 reflects the image beam onto the first reflectors 140 in sequence. However, in other embodiments, the stereo display apparatus 100 may be without the second reflector 150, and the projector 200 projects the image beam 222 to the first reflectors 140 directly.

In the embodiment, the stereo display apparatus 100 further includes a rotating position sensor 310 disposed adjacently to the support member 110 and electrically connected to the projector 200, wherein the rotating position sensor 310 is capable of detecting a rotating position of the support member 110. In the embodiment, the rotating position sensor 310 is for example a sensor utilizing optical principle and including a light source and a light sensor, and the support member 110 has a light passing hole for instance. When the light passing hole moves to a position between the light source and the light sensor by rotating of the support member 110, the light emitted by the light source is capable of passing through the light passing hole to be detected by the light sensor. By detecting the position of the light passing hole, the rotating position sensor 310 is capable of detecting the rotating position and the rotating speed of the support member 110.

In the embodiment, the stereo display apparatus 100 further includes a plurality of micro structures 122 (as shown in FIG. 1B). The micro structures 122 are disposed on a surface of the screen 120 or adhered on the screen 120 as optical sheets. Each of the micro structures 122 is a prism structure, each of the prism structures, for example, extends along the z axis, and the prism structures are arranged along a direction perpendicular to the z axis. The prism structures shown in FIG. 1B are arranged along the y axis. The prism structures are capable of converging the divergence angle of the light beam emitted from the image projected to the prism structures, such that a visual angle limiting effect is achieved. Thus, when the screen 120 faces a user, the user may watch the image on the screen 120 clearly. In this way, the stereo display apparatus 100 is capable of displaying correct image at specific angle more precisely without being interfered by the image at other angles. However, in other embodiments, the screen 120 may be an ordinary front projection screen capable of scattering the light or a back projection screen capable of diffusing the light.

In the stereo display apparatus 100 of the embodiment, the projector 200 and the screen 120 are capable of rotating together, such that the projector 200 is capable of projecting correct image onto the screen 120 rotating to different angles. Thus, compared with the conventional stereo display apparatus dividing an image into several sub-images arranged as a circle and causing the resolution to be lowered, the stereo display apparatus 100 of the embodiment is capable of projecting complete images at different angles and therefore has higher resolution.

In addition, in the stereo display apparatus 100 of the embodiment, the projector 200 includes a battery 240 and an image memory module 250. Therefore, the projector 200 is capable of being connected to a power source without using a power wire, and capable of receiving an image signal from a computer without using a signal wire. Thus, the projector 200 is capable of rotating with the support member without causing an intertwining of the power wire and the signal wire, and the difficulty of transmitting power and signals may be overcome.

Further, in the stereo display apparatus 100 of the embodiment, no object is disposed in a transmitting path of the image beam 222 generated by the projector 200, and the image beam 222 may not be blocked, such that no stray light is generated to affect the quality of the projecting image. The projector 200 of the embodiment is for example a pico-projector, so that the total volume and weight may be reduced. In addition, in the stereo display apparatus 100 of the embodiment, the actuator 130 is fixed on the base 160, such that the center of gravity of the stereo display apparatus 100 is at a lower position, and the rotation of the support member 110 and the elements (such as the screen 120, the projector 200, and the second reflector 150, etc.) connected to the support member 110 is stable to prevent swaying of the image.

A preprocessing may be performed on the image before the image displayed by the stereo display apparatus 100 is saved to the image memory module 250. For example, an object may be put on the position of the screen 120 to replace the screen 120. Then, the object is rotated by the rotation of the support member 110, and the images of the object at different angles are captured. The images are combined to a plurality of panoramic images. Each of the panoramic images is divided into a plurality of images at different view angles. In the embodiment, each of the panoramic images is divided into 9 images corresponding to 9 different view angles. Finally, the images are saved to the image memory module 250.

In the embodiment, a frame updating frequency is for example 60 hertz. The angle between the two first reflectors 140 is 40 degrees, and there are 9 first reflectors 140 disposed, so that a rotating frequency of the screen 120 and the support member 110 is 6.67 seconds per revolution. However, if the frame updating frequency is 40 hertz, the angle between the two first reflectors 140 may be 60 degrees, and there are 6 first reflectors 140 disposed, and the rotating frequency of the screen 120 and the support member 110 is still 6.67 seconds per revolution. However, the frame updating frequency, the number of the first reflectors 140, the angle between the two first reflectors 140, and the rotating frequency herein are taken as examples and are not intended to be limited to any particular value.

Figure 2:
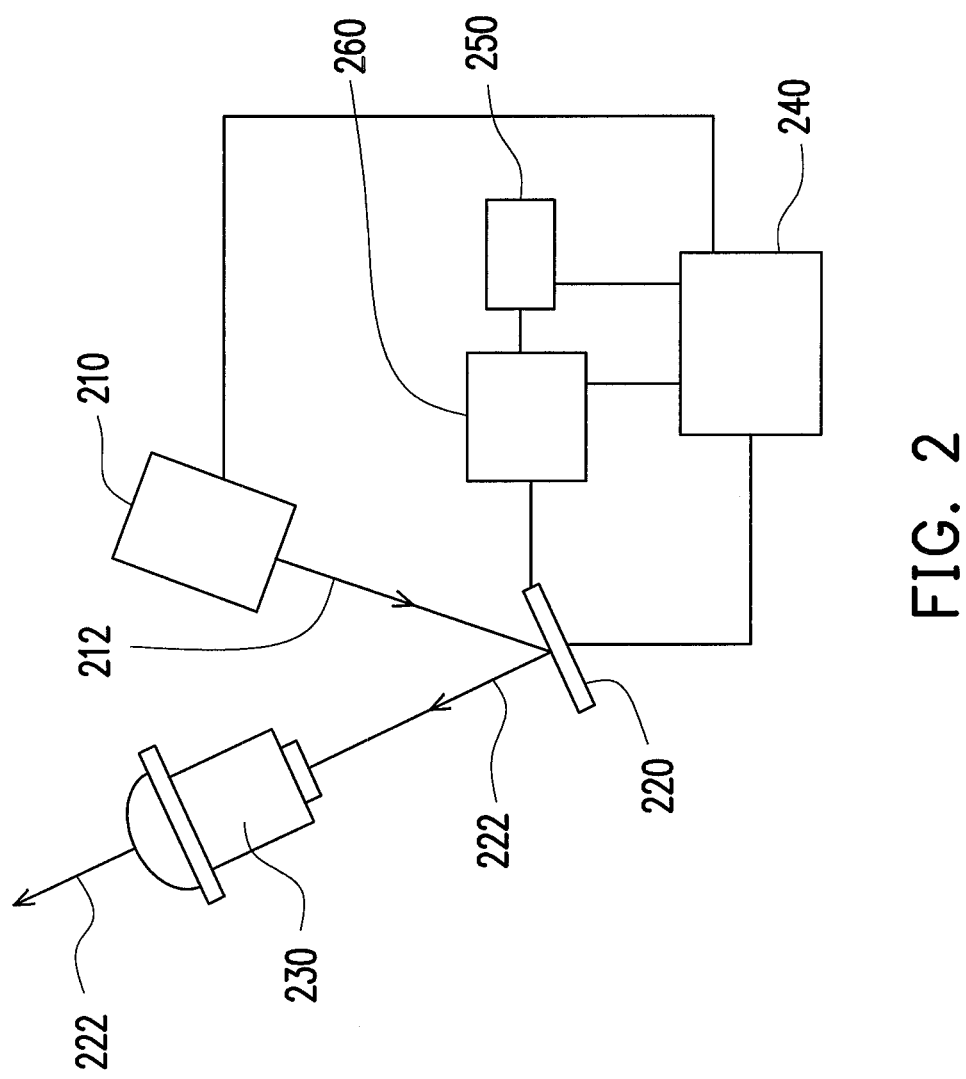
FIG. 2 is a schematic view showing the structure of the projector of FIG. 1A.
Figure 3:
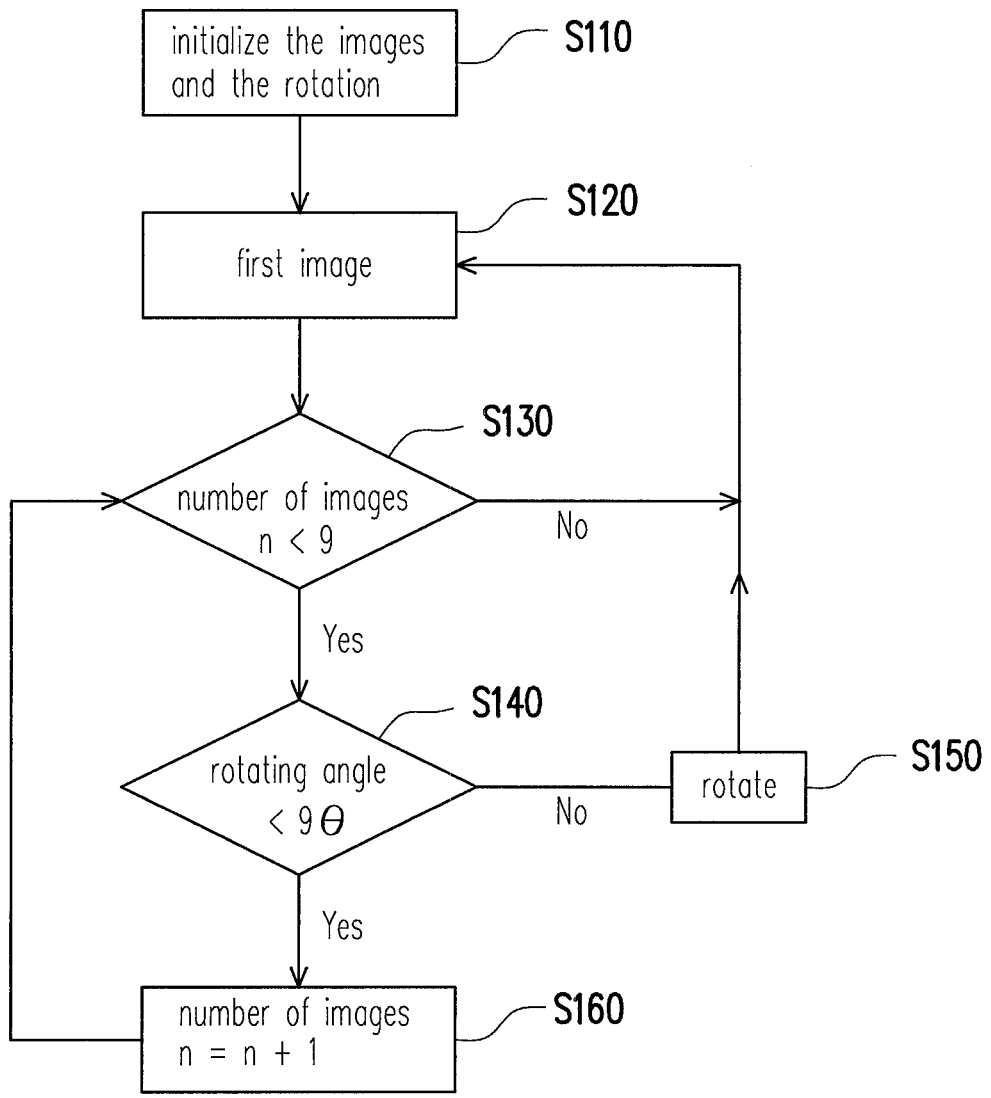
FIG. 3 showing an operating process of the processing unit in FIG. 2.

Referring to FIG. 1A, FIG. 2 and FIG. 3, after saving the images to the image memory module 250, and when the stereo image is starting to be displayed, the processing unit 260 performs the step S110 to initialize the images and initialize the rotation (for example, rotating the support member 110 to a initial angle). Then, the step S120 is performed for reading a first image from the image memory module 250 and exporting the first image to the light valve 220, wherein the first image is an image corresponding to the initial angle of the support member 110 in each frame. The step S130 is performed for judging whether the number of images displayed during a frame is smaller than 9 or not. In this embodiment, the image is divided into 9 images at 9 different view angles. If the number of images displayed during a frame is larger than 9, it is returned to step S120 for reading and exporting a first image of the next frame. If the number of images displayed during a frame is smaller than 9, the step S140 is performed for judging whether a rotating angle is smaller than 9θ or not. In this embodiment, θ is substantially equal to 40 degrees, and the processing unit 260 is capable of detecting a rotating angle of the support member 110 by signals transmitted from the rotating position sensor 310. If the rotating angle is larger than 9θ, the step S150 is performed to make the support member 110 to rotate to next angle, and it is returned to the step S120 for displaying a first image of next frame. If the rotating angle is smaller than 9θ, the step S160 is performed for adding an image (in other words, displaying a next image of this frame), and it is returned to step S130. By the steps of FIG. 3, the rotation of the support member 110 (the rotation of the screen 120) is synchronized with the image projected by the projector 200. The operating process of the processing unit 260 herein is taken as an example, and any processing unit adopts an operating process capable of synchronizing the rotation of the support member 110 and the image projected by the projector 200 is in the protecting range of the invention.

Figure 4:
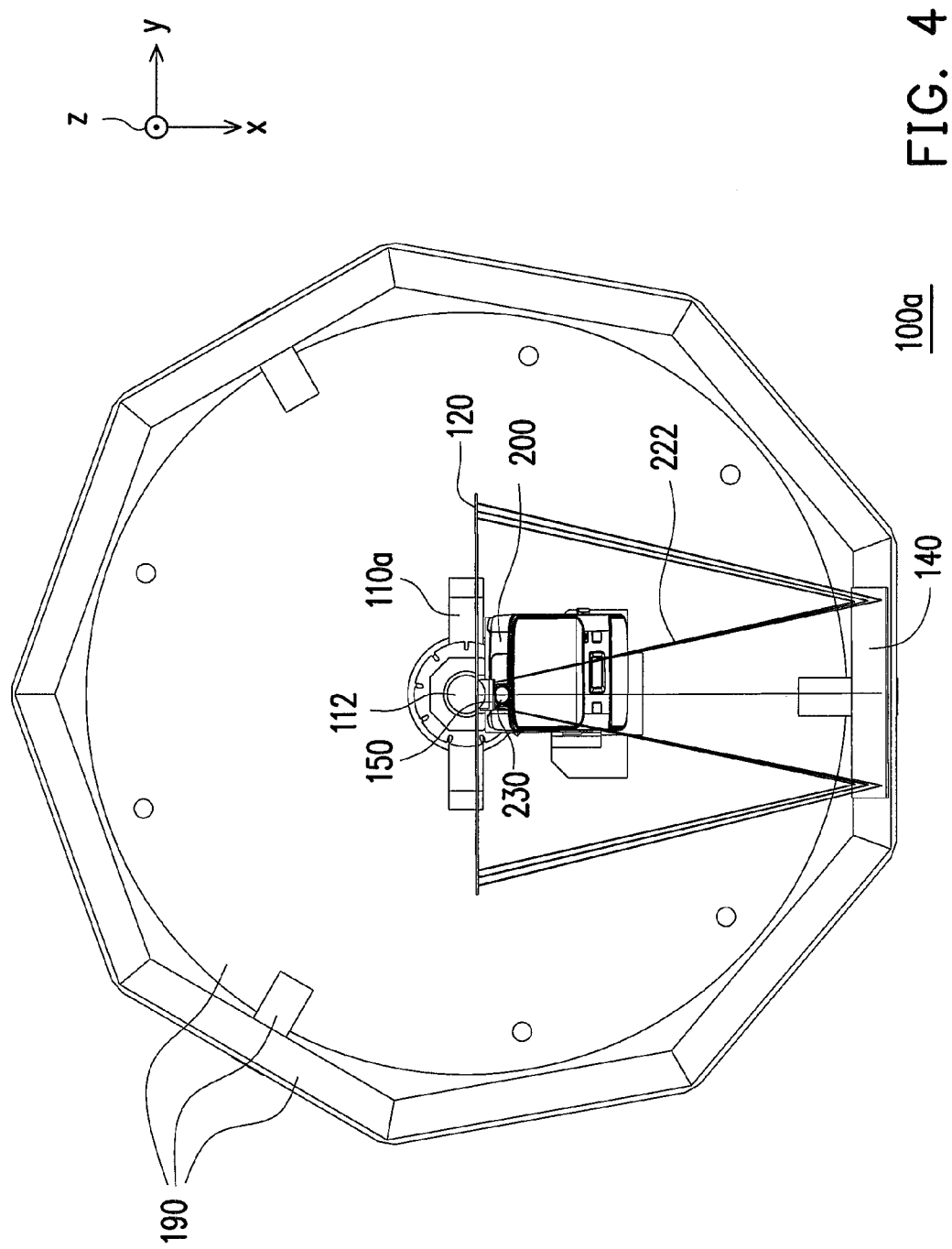
FIG. 4 is a top view showing a stereo display apparatus according to another embodiment of the invention.

Referring to FIG. 4, the stereo display apparatus 100a is similar to the stereo display apparatus 100 in FIG. 1B, the differences between the stereo display apparatus 100a and the stereo display apparatus 100 are mentioned below. The stereo display apparatus 100a of the embodiment includes at least one first reflector 140 (showing one in FIG. 4) connected to the support member 110a. Specifically, in the embodiment, the support member 110a further includes a support frame 190 connected to the rotating axle 112 and the first reflector 140. The first reflector 140 is connected to the support member 110a, so that the support member 110a is capable of driving the projector 200, the first reflector 140, and the screen 120 to rotate. When the projector 200, the first reflector 140, and the screen 120 rotate, the image beam 222 is projected onto the first reflector 140 continuously, and the first reflector 140 reflects the image beam 222 onto the screen 120. In the embodiment, the image beam 222 from the projector 200 is reflected to the first reflector 140 by the second reflector 150.

Figure 5:
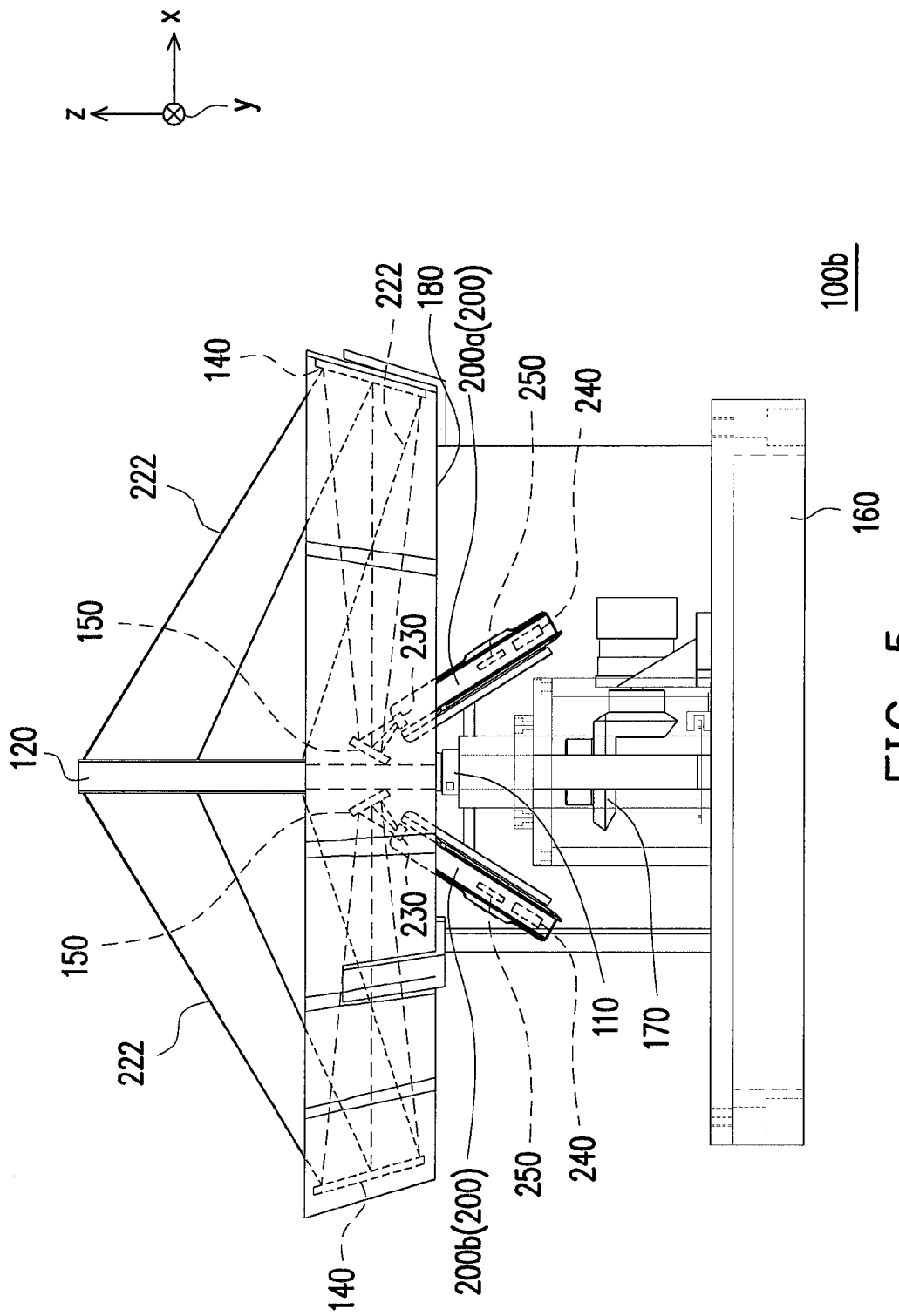
FIG. 5 is a side view showing a stereo display apparatus according to another embodiment of the invention.

Referring to FIG. 5, the stereo display apparatus 100b is similar to the stereo display apparatus 100 in FIG. 1A, the differences between the stereo display apparatus 100b and the stereo display apparatus 100 are mentioned below. The stereo display apparatus 100b includes two projectors 200 (200a and 200b) disposed at two opposite sides of the support member 110 respectively. In addition, in the embodiment, the stereo display apparatus 100b further includes two second reflectors 150 disposed at two opposite sides of the support member 110 respectively. The projector 200a and the projector 200b are capable of projecting two images at two different angles onto two opposite surfaces of the screen 120 at the same time, such that a frame updating frequency is increased. In addition, the structure adopting two projectors 200 may not only be applied to the stereo display apparatus 100 of FIG. 1A, but also applied to the stereo display apparatus 100a of FIG. 4. The two first reflectors 140 connected to the support member 110a and rotated with the support member 110a are used when the structure adopting two projectors 200 is applied to the stereo display apparatus 100a of FIG. 4. In addition, the two first reflectors 140 are respectively disposed at two opposite sides of the support member 110a to respectively reflect the image beam 222 projected by the projector 200 onto two opposite surfaces of the screen 120.

In summary, the embodiment or the embodiments of the invention may have at least one of the following advantages:

In the embodiment of the invention, the projector and the screen are capable of rotating together, such that the projector is capable of projecting correct image onto the screen rotating to different angles. Thus, compared with the conventional stereo display apparatus dividing an image into several sub-images arranged as a circle and causing the resolution to be lowered, the stereo display apparatus of the embodiments of the invention is capable of projecting complete images at different angles and therefore has higher resolution.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A stereo display apparatus, comprising:
   a support member;
   at least one projector, being connected to the support member and comprising an image memory module, wherein the projector is capable of emitting an image beam;
   a screen, being connected to the support member;
   a plurality of first reflectors, surrounding the support member;
   at least one second reflector, being connected to the support member and located between the projector and the screen, wherein a top edge of the screen is located above a top edge of the second reflector; and
   an actuator, being connected to the support member and capable of driving the support member to rotate, wherein the support member is capable of driving the projector, the second reflector, and the screen to rotate, the image beam is projected onto the second reflector continuously, the second reflector reflects the image beam onto the first reflectors in sequence, and the first reflectors reflect the image beam onto the screen in sequence when the projector, the second reflector, and the screen rotate.

2. The stereo display apparatus as claimed in claim 1, further comprising a base, wherein the actuator is fixed on the base, and the support member is rotatably connected to the base.

3. The stereo display apparatus as claimed in claim 1, further comprising a support frame, being connected to the first reflectors and the base.

4. The stereo display apparatus as claimed in claim 1, wherein the support member comprises a rotating axle, and the projector and the screen are fixed on the rotating axle.

5. The stereo display apparatus as claimed in claim 1, further comprising a plurality of micro structures, disposed on a surface of the screen.

6. The stereo display apparatus as claimed in claim 5, wherein each of the micro structures is a prism structure.

7. The stereo display apparatus as claimed in claim 1, further comprising a transmission device, being connected to the actuator and the support member.

8. The stereo display apparatus as claimed in claim 7, wherein the transmission device comprises a gear.

9. The stereo display apparatus as claimed in claim 1, further comprising a rotating position sensor, disposed adjacently to the support member and electrically connected to the projector, wherein the rotating position sensor is capable of detecting a rotating position of the support member.

10. A stereo display apparatus, comprising:
    a support member;
    at least one projector, being connected to the support member and comprising an image memory module, wherein the projector is capable of emitting an image beam;
    a screen, being connected to the support member;
    at least one first reflector, being connected to the support member;

at least one second reflector, being connected to the support member and located between the projector and the screen, wherein a top edge of the screen is located above a top edge of the second reflector; and an actuator, being connected to the support member and capable of driving the support member to rotate, wherein the support member is capable of driving the projector, the first reflector, and the screen to rotate, the image beam is projected onto the second reflector, the second reflector reflects the image beam onto the first reflector, and the first reflector reflects the image beam onto the screen when the projector, the first reflector, and the screen rotate.

11. The stereo display apparatus as claimed in claim 10, further comprising a base, wherein the actuator is fixed on the base, and the support member is rotatably connected to the base.

12. The stereo display apparatus as claimed in claim 10, wherein the support member comprises a rotating axle, and the projector and the screen are fixed on the rotating axle.

13. The stereo display apparatus as claimed in claim 12, wherein the support member further comprises a support frame, being connected to the rotating axle and the first reflector.

14. The stereo display apparatus as claimed in claim 10, further comprising a plurality of micro structures, disposed on a surface of the screen.

15. The stereo display apparatus as claimed in claim 14, wherein each of the micro structures is a prism structure.

16. The stereo display apparatus as claimed in claim 10, further comprising a transmission device, being connected to the actuator and the support member.

17. The stereo display apparatus as claimed in claim 16, wherein the transmission device comprises a gear.

18. The stereo display apparatus as claimed in claim 10, further comprising a rotating position sensor, disposed adjacently to the support member and electrically connected to the projector, wherein the rotating position sensor is capable of detecting a rotating position of the support member.

* * * * *